US011210938B2

(12) United States Patent
Fang et al.

(10) Patent No.: US 11,210,938 B2
(45) Date of Patent: Dec. 28, 2021

(54) INTELLIGENT ROAD SIDE UNIT AND REGULATION METHOD THEREOF

(71) Applicant: BAIDU ONLINE NETWORK TECHNOLOGY (BEIJING) CO., LTD., Beijing (CN)

(72) Inventors: Lei Fang, Beijing (CN); Haisong Wang, Beijing (CN); Xing Hu, Beijing (CN); Sheng Tao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 208 days.

(21) Appl. No.: 16/546,619

(22) Filed: Aug. 21, 2019

(65) Prior Publication Data
US 2020/0074854 A1 Mar. 5, 2020

(30) Foreign Application Priority Data

Aug. 31, 2018 (CN) .......................... 201811014578.7

(51) Int. Cl.
*G08G 1/01* (2006.01)
*G06K 9/00* (2006.01)
(Continued)

(52) U.S. Cl.
CPC ............ *G08G 1/0145* (2013.01); *G01S 13/93* (2013.01); *G06K 9/00785* (2013.01); *G08G 1/095* (2013.01)

(58) Field of Classification Search
CPC ...... G08G 1/0145; G08G 1/095; G01S 13/93; G06K 9/00785
See application file for complete search history.

(56) References Cited

U.S. PATENT DOCUMENTS 5,444,442 A * 8/1995 Sadakata .................. G08G 1/08
340/916
6,466,260 B1 * 10/2002 Hatae .................... G08G 1/0175
348/149
(Continued)

FOREIGN PATENT DOCUMENTS

CN 103531031 A 1/2014
CN 103903453 A 7/2014
(Continued)

OTHER PUBLICATIONS

Office Action for Japanese Application 2019133679, dated Sep. 17, 2020, 10 pages.
(Continued)

*Primary Examiner* — Mohamed Barakat
(74) *Attorney, Agent, or Firm* — Fay Sharpe LLP

(57) ABSTRACT

The present disclosure proposes an intelligent road side unit and a regulation method thereof. The intelligent road side unit comprises: traffic lights; a first camera configured to acquire a first image and having a first focal length; a second camera configured to acquire a second image and having a second focal length, the first focal length being greater than the second focal length; and a controller, configured to acquire anticipated arriving traffic flow information according to the first image, to acquire current traffic flow information according to the second image, and to control the traffic lights according to the anticipated arriving traffic flow information and the current traffic flow information.

14 Claims, 1 Drawing Sheet

(51) Int. Cl.
  *G01S 13/93*  (2020.01)
  *G08G 1/095*  (2006.01)

(56) References Cited

U.S. PATENT DOCUMENTS

| | | | | |
|---|---|---|---|---|
| 2011/0182473 A1* | 7/2011 | Wang | ............... | G06K 9/00785 |
| | | | | 382/103 |
| 2014/0339374 A1* | 11/2014 | Mian | ............... | G08B 13/1436 |
| | | | | 246/473.1 |
| 2016/0241839 A1* | 8/2016 | Crona | ............... | H04N 13/189 |
| 2018/0096595 A1* | 4/2018 | Janzen | ............... | G06K 9/0063 |

FOREIGN PATENT DOCUMENTS

| | | | |
|---|---|---|---|
| CN | 106846840 A | | 6/2017 |
| CN | 1068468940 A | | 6/2017 |
| CN | 107316470 A | | 11/2017 |
| CN | 108389409 A | | 8/2018 |
| CN | 108417055 A | | 8/2018 |
| CN | 108417056 A | | 8/2018 |
| JP | H06150187 A | | 5/1994 |
| JP | 2003157487 A | | 5/2003 |
| JP | 2008299785 A | | 12/2008 |
| JP | 2014016474 A | | 1/2014 |

OTHER PUBLICATIONS

Office Action for Chinese Application No. 201811014578.7, dated Jul. 13, 2020, 27 pages.
Extended European Search Report for EP Application No. 19192997.5, dated Jan. 24, 2020, 9 pages.

* cited by examiner

INTELLIGENT ROAD SIDE UNIT AND REGULATION METHOD THEREOF

CROSS REFERENCE TO RELATED APPLICATION

This application claims priority under 35 U.S.C. § 119(a) on Chinese Patent Application No. 201811014578.7, filed with the State Intellectual Property Office of P. R. China on Aug. 31, 2018, the entire contents of which are incorporated herein by reference.

TECHNICAL FIELD

The present disclosure relates to a field of transportation technology, and more particularly, to an intelligent road side unit and a regulation method in the intelligent road side unit.

BACKGROUND

An intelligent road side unit is an important support for automatic driving. As requirements on intelligence level of the intelligent road side unit increases, requirements on the sensing capability of the intelligent road side unit is also increasing, which requires to add various sensors in the intelligent road side unit to improve the active sensing capability of the intelligent road side unit. However, as for intersections with a rather heavy traffic flow, the regulation capability of the intelligent road side unit is still unsatisfying.

SUMMARY

The present disclosure proposes an intelligent road side unit and a regulation method in the intelligent road side unit, so as to solve a problem in the art that the conventional intelligent road side unit has a poor regulation capability at intersections with a heavy traffic flow.

Embodiments according to a first aspect of the present disclosure provide an intelligent road side unit, comprising: traffic lights; a first camera configured to acquire a first image and having a first focal length; a second camera configured to acquire a second image and having a second focal length, the first focal length being greater than the second focal length; and a controller, configured to acquire anticipated arriving traffic flow information according to the first image, to acquire current traffic flow information according to the second image, and to control the traffic lights according to the anticipated arriving traffic flow information and the current traffic flow information.

The intelligent road side unit according to the embodiments of the present disclosure comprises the traffic lights, the first camera configured to acquire a first image and having a first focal length, the second camera configured to acquire a second image and having a second focal length, the first focal length being greater than the second focal length, and the controller configured to acquire anticipated arriving traffic flow information according to the first image, to acquire current traffic flow information according to the second image, and to control the traffic lights according to the anticipated arriving traffic flow information and the current traffic flow information. Consequently, by providing two cameras with different focal lengths to acquire the traffic flow in the distance and the traffic flow in the vicinity, the traffic lights may be controlled according to both the anticipated arriving traffic flow information and the current traffic flow information. That is, the traffic lights are controlled not only according to a current traffic flow, but also according to a predicted traffic flow, thereby improving the regulation capability of the intelligent road side unit.

Embodiments according to another aspect of the present disclosure provide a regulation method in the intelligent road side unit, comprising: acquiring a first image via a first camera having a first focal length and a second image via a second camera having a second focal length, the first focal length being greater than the second focal length; acquiring anticipated arriving traffic flow information according to the first image, and current traffic flow information according to the second image; and controlling traffic lights according to the anticipated arriving traffic flow information and the current traffic flow information.

The regulation method in the intelligent road side unit according to the embodiments of the present disclosure acquires a first image via a first camera having a first focal length and a second image via a second camera having a second focal length, the first focal length being greater than the second focal length, acquires anticipated arriving traffic flow information according to the first image, and current traffic flow information according to the second image; and controls traffic lights according to the anticipated arriving traffic flow information and the current traffic flow information. Consequently, by providing two cameras with different focal lengths to acquire the traffic flow in the distance and the traffic flow in the vicinity, the traffic lights may be controlled according to both the anticipated arriving traffic flow information and the current traffic flow information. That is, the traffic lights are controlled not only according to a current traffic flow, but also according to a predicted traffic flow, thereby improving the regulation capability of the intelligent road side unit.

Embodiments according to yet another aspect of the present disclosure provide an intelligent road side unit, comprising: a processor; and a memory. The processor runs a program corresponding to executable program codes by reading the executable program codes stored in the memory, to implement the regulation method in the intelligent road side unit according to the embodiments of the another aspect described above.

Embodiments according to still another aspect of the present disclosure provide a non-transitory computer readable storage medium having a computer program stored thereon. When the program is executed by a processor, the program implements the regulation method in the intelligent road side unit according to the embodiments of the another aspect described above.

Additional aspects and advantages of the present disclosure will be given in the following description, some of which will become apparent from the following description or be learned from practices of the present disclosure.

BRIEF DESCRIPTION OF THE DRAWINGS

The foregoing and/or additional aspects and advantages of the present disclosure become obvious and easily understood in descriptions of the embodiments with reference to the following accompanying drawings.

DETAILED DESCRIPTION

Embodiments of the present disclosure will be described below in detail, examples of which are illustrated in accompanying drawings. Throughout the drawings, the same or similar reference signs refer to the same or similar elements or elements that have the same or similar functions. The embodiments described below with reference to the accompanying drawings are merely exemplary and intends to illustrate and explain the present disclosure, and should not be construed as a limit to the present disclosure.

Hereinafter, an intelligent road side unit and a regulation method in the intelligent road side unit according to the embodiments of the present disclosure will be described with reference to the drawings.

The embodiments of the present disclosure propose an intelligent road side unit for solving the problem in the art that the conventional intelligent road side unit has a poor regulation capability at intersections with a heavy traffic flow.

The intelligent road side unit according to embodiments of the present disclosure provides two cameras with different focal lengths to acquire the traffic flow in the distance and the traffic flow in the vicinity, to control the traffic lights according to both the anticipated arriving traffic flow information and the current traffic flow information. That is, the traffic lights are controlled not only according to a current traffic flow, but also according to a predicted traffic flow, thereby improving the regulation capability of the intelligent road side unit.

Figure 1:
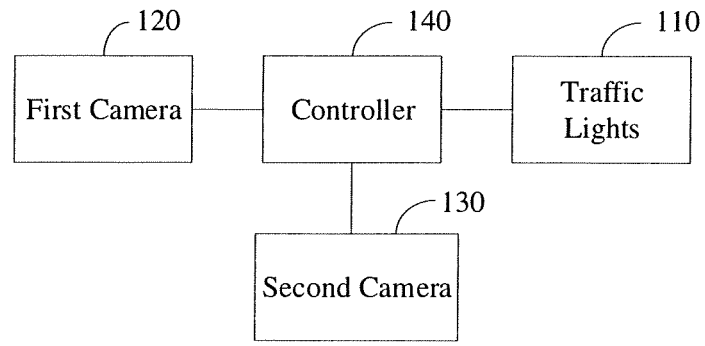
FIG. 1 is a structure schematic diagram of an intelligent road side unit according to an embodiment of the present disclosure.

FIG. 1 is a structure schematic diagram of an intelligent road side unit according to an embodiment of the present disclosure.

As shown in FIG. 1, the intelligent road side unit comprises traffic lights 110, a first camera 120, a second camera 130 and a controller 140.

The first camera 120 is configured to acquire a first image and has a first focal length. The second camera 130 is configured to acquire a second image and has a second focal length. The first focal length is greater than the second focal length.

In this embodiment, since the focal length of the first camera 120 is greater than that of the second camera 130, the first camera 120 may acquire an image within a preset distance range of a road in the distance, while the second camera 130 may acquire an image within a preset distance range of a road in the vicinity.

In a specific implementation, the first camera 120 may be a telephoto lens, and the second camera 130 may be a medium telephoto lens or a short-focus lens.

The controller 140 is configured to acquire anticipated arriving traffic flow information according to the first image, to acquire current traffic flow information according to the second image, and to control the traffic lights 110 according to the anticipated arriving traffic flow information and the current traffic flow information.

In this embodiment, the controller 140 may acquire the number of vehicles in the distance by recognizing the first image. Since the vehicles in the distance will arrive at the intersection after a certain time, the anticipated arriving traffic flow information may be determined according to the number of the vehicles in the distance.

The controller 140 may acquire the number of the vehicles in the road in the vicinity by recognizing the second image. Consequently, the current traffic flow information may be acquired.

The controller 140 may control the traffic lights 110 according to the anticipated arriving traffic flow and the current traffic flow. For example, if both the anticipated arriving traffic flow and the current traffic flow are heavy, a green-light time period may be increased. Further, if the current traffic flow is not heavy but the anticipated arriving traffic flow is heavy, the green-light time period may also be increased.

As an example, the intelligent road side unit may include eight cameras. Two cameras are disposed in each of four directions of an intersection, one being the first camera and the other being the second camera. When the current traffic flow and the anticipated arriving traffic flow are different in different directions of the same road, the traffic lights may be controlled according to the direction with a heavier traffic flow. For example, if both the current traffic flow and the anticipated traffic in a direction from east to west are greater than those in a direction from west to east, the traffic lights may be controlled according to the traffic flow in the direction from east to west.

In practice, for an intersection with a heavy traffic flow, an image of a road in the distance and an image of the road in the vicinity may be acquired by providing two cameras with different focal lengths. Consequently, the anticipated arriving traffic flow information and the current traffic flow information may be determined according to the images captured by the two cameras. Further, the traffic lights may be controlled according to the anticipated arriving traffic flow information and the current traffic flow information. Since not only the current traffic flow but also the anticipated arriving traffic flow information are taken into consideration, the regulation accuracy and regulation capability of the intelligent road side unit are greatly improved.

Furthermore, the controller may determine the green-light time period according to the traffic flow, and further control the traffic lights. Specifically, the controller 140 determines a current green-light time period according to the current traffic flow information, determines a delayed green-light time period according to the anticipated arriving traffic flow information, and determines a total green-light time period according to the current green-light time period and the delayed green-light time period, and controls the traffic lights 110 according to the total green-light time period.

The controller 140 calculates a total intersection passing-through time for the vehicles in the vicinity, i.e., the current green-light time period, according to the current traffic flow information and an average speed at which the vehicles pass through the intersection. The controller 140 predicts an arrival time for the approaching vehicles in the distance, i.e., the delayed green-light time period, according to the anticipated arriving traffic flow. Then, the controller 140 calculates a sum of the current green-light time period and the delayed green-light time period, as the total green-light time period. Next, the controller 140 may adjust the green-light time period to the total green-light time period to ensure that both the vehicles in the vicinity and in the distance may pass the intersection, thereby regulating the traffic flow at the intersection.

To improve the accuracy of regulation, in this embodiment, a mounting position of the first camera 120 may be higher than that of the second camera 130, such that the first camera may capture images of the vehicles in the distance accurately.

In practice, the cameras may be interfered by radar signals. To improve the definition of images, in this embodiment, the intelligent road side unit may further comprise a shielding layer for enclosing at least part of each of the first camera 120 and the second camera 130. In other words, the intelligent road side unit includes two shielding layers for enclosing at least part of the first camera 120 and at least part of the second camera 130, respectively.

Since the shielding layer may affect heat dissipation, in practice, the shielding layer may enclose each of the first camera 120 and the second camera 130 except for a lens portion and a heat dissipation portion of that camera. Consequently, the definition of images may be improved without affecting the operations and heat dissipation of the cameras.

Figure 2:
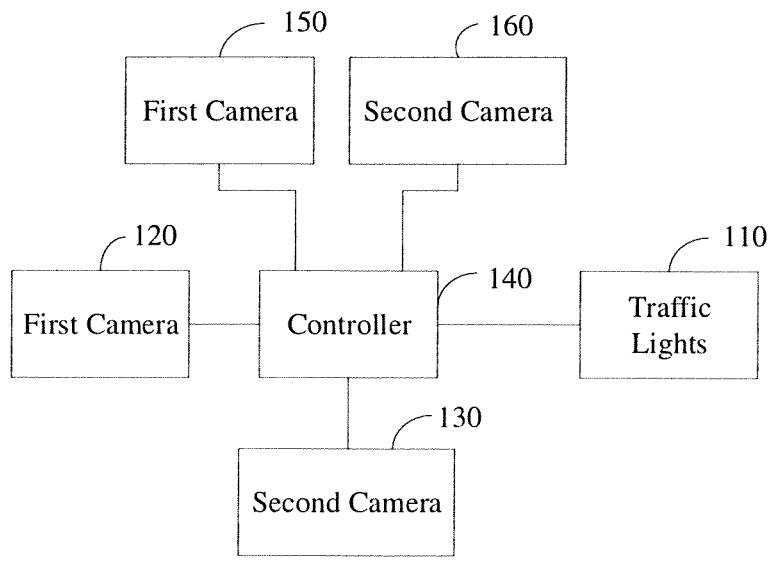
FIG. 2 is a structure schematic diagram of an intelligent road side unit according to another embodiment of the present disclosure.

FIG. 2 is a structure schematic diagram of an intelligent road side unit according to another embodiment of the present disclosure.

To improve the regulation accuracy of the intelligent road side unit, on the basis of the embodiment illustrated in FIG. 1, the intelligent road side unit may further comprise: a first radar 150 and a second radar 160, as shown in FIG. 2.

A detection distance of the first radar 150 is greater than that of the second radar 160.

In an arrangement, the first radar 150 may have a height higher than that of the second radar 160. In this way, the first radar 150 is configured to detect obstacle information in the distance while the second radar 160 is configured to detect obstacle information in the vicinity of the intelligent road side unit. Here, the obstacle information may include information about a distance between an obstacle and the intelligent road side unit, an orientation of the obstacle, or the like.

Since a laser radar has advantages of high accuracy and anti-interference capability, in a specific implementation, each of the first radar 150 and the second radar 160 may be a laser radar. Since a detection distance of the first radar 150 is greater than that of the second radar 160, in a specific implementation, the first radar 150 may be a 64-channel laser radar while the second radar 160 may be a 16-channel laser radar. In this way, the detection accuracy of the first radar is ensured, while the costs of the second radar is reduced.

The controller 140 may determine the anticipated arriving traffic flow information accurately according to the first image and the obstacle information in the distance detected by the first radar 150, and determine the current traffic flow information according to the second image and the obstacle information in the vicinity of the intelligent road side unit detected by the second radar 160, thereby controlling the traffic lights 110 according to the anticipated arriving traffic flow information and the current traffic flow information.

Since the radars may detect information about a distance, a speed, an orientation, etc., of a vehicle accurately, the traffic lights may be controlled according to the vehicle information detected by the radars and images captured by the cameras, thereby improving the control accuracy of the intelligent road side unit to the traffic lights and the regulation accuracy of the intelligent road side unit significantly.

Furthermore, the intelligent road side unit may further comprise an antenna.

The intelligent road side unit may transmit the obstacle information detected by the radars, images captured by the cameras and the green-light time period to a server or an unmanned vehicle through the antenna.

The unmanned vehicle may receive the information transmitted from the intelligent road side unit, and performs corresponding controlling operations according to the received information, thereby improving the security and reliability of the unmanned vehicle.

In order to prevent the antenna from interfering with the cameras, a distance between the antenna and the cameras is greater than a preset distance. That is to say, the distance between the antenna and the first camera 120 is greater than a preset distance, and the distance between the antenna and the second camera 130 is greater than the preset distance.

Figure 3:
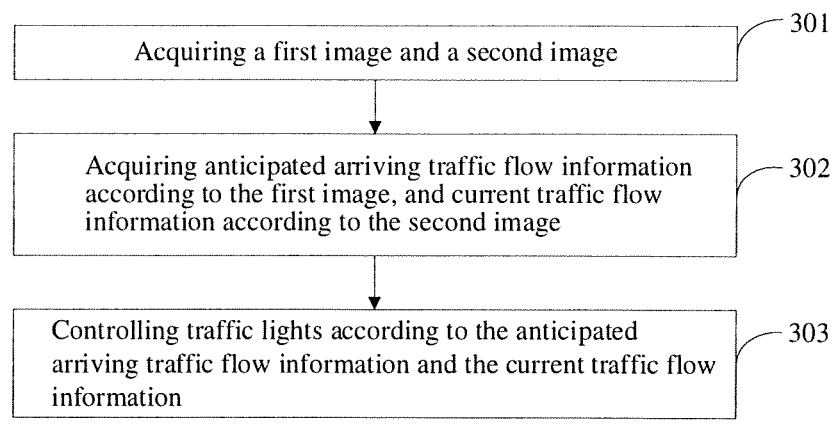
FIG. 3 is a schematic flow diagram of a regulation method in an intelligent road side unit according to an embodiment of the present disclosure.

In order to implement the above embodiments, the embodiments of the present disclosure further provide a regulation method in an intelligent road side unit. FIG. 3 is a schematic flow diagram of a regulation method in the intelligent road side unit according to an embodiment of the present disclosure.

The regulation method in the intelligent road side unit according to the embodiments of the present disclosure may be performed by the intelligent road side unit according to the embodiments of the present disclosure, for controlling the traffic lights according to the images captured by two cameras having different focal lengths.

As shown in FIG. 3, the regulation method in the intelligent road side unit comprises the following steps.

In step 301, a first image and a second image are acquired.

In this embodiment, the first image may be acquired by a first camera having a first focal length, and the second image may be acquired by a second camera having a second focal length. The first focal length is greater than the second focal length.

In a specific implementation, the first camera may be a telephoto lens, and the second camera may be a medium telephoto lens or a short-focus lens.

In this embodiment, since the focal length of the first camera is greater than that of the second camera, the first camera may acquire an image within a preset distance range of a road in the distance, while the second camera may acquire an image within a preset distance range of a road in the vicinity.

In step 302, anticipated arriving traffic flow information may be acquired according to the first image, and current traffic flow information may be acquired according to the second image.

In this embodiment, the number of vehicles in the distance may be acquired by recognizing the first image. Since the vehicles in the distance will arrive at the intersection after a certain time, the anticipated arriving traffic flow information may be determined according to the number of the vehicles in the distance.

The number of the vehicles in the road in the vicinity may be acquired by recognizing the second image. Consequently, the current traffic flow information may be acquired.

In step 303, the traffic lights may be controlled according to the anticipated arriving traffic flow information and the current traffic flow information.

The intelligent road side unit may control the traffic lights according to the anticipated arriving traffic flow and the current traffic flow. For example, if both the anticipated arriving traffic flow and the current traffic flow are heavy, a green-light time period may be increased. Further, if the current traffic flow is not heavy but the anticipated arriving traffic flow is heavy, the green-light time period may also be increased.

In practice, for an intersection with a heavy traffic flow, an image of a road in the distance and an image of the road in the vicinity may be acquired by providing two cameras with different focal lengths. Consequently, the anticipated arriving traffic flow information and the current traffic flow information may be determined according to the images captured by the two cameras. Further, the traffic lights may be controlled according to the anticipated arriving traffic flow information and the current traffic flow information. Since not only the current traffic flow but also the anticipated arriving traffic flow information are taken into consideration, the regulation accuracy and regulation capability of the intelligent road side unit are greatly improved.

Furthermore, the intelligent road side unit may determine the green-light time period according to the traffic flow, and further control the traffic lights. Specifically, the intelligent road side unit determines a current green-light time period according to the current traffic flow information, determines a delayed green-light time period according to the anticipated arriving traffic flow information, and determines a total green-light time period according to the current green-light time period and the delayed green-light time period, and controls the traffic lights according to the total green-light time period.

More specifically, the intelligent road side unit calculates a total intersection passing-through time for the vehicles in the vicinity, i.e., the current green-light time period, according to the current traffic flow information and an average speed at which the vehicles pass through the intersection. The intelligent road side unit predicts an arrival time for the approaching vehicles in the distance, i.e., the delayed green-light time period, according to the anticipated arriving traffic flow. Then, the intelligent road side unit calculates a sum of the current green-light time period and the delayed green-light time period, as the total green-light time period. Next, the controller 140 may adjust the green-light time period to the total green-light time period to ensure that both the vehicles in the vicinity and in the distance may pass the intersection, thereby regulating the traffic flow at the intersection.

To improve the accuracy of regulation, in this embodiment, a mounting position of the first camera may be higher than that of the second camera, such that the first camera may capture images of the vehicles in the distance accurately.

In practice, the cameras may be interfered by radar signals. To improve the definition of images, in this embodiment, a shielding layer may enclose at least part of each of the first and second cameras. In other words, at least part of the first camera may be enclosed by a shielding layer, and at least part of the second camera may be enclosed by another shielding layer.

Since the shielding layer may affect heat dissipation, in practice, the shielding layer may enclose each of the first camera and the second camera except for a lens portion and a heat dissipation portion of that camera. Consequently, the definition of images may be improved without affecting the operations and heat dissipation of the cameras.

To improve the regulation capability of the intelligent road side unit, when determining the traffic flow information, the traffic flow information may be determined according to both the images acquired by the cameras and obstacle information detected by radars. Specifically, the step of acquiring the anticipated arriving traffic flow information according to the first image and the current traffic flow information according to the second image, comprises: acquiring the anticipated arriving traffic flow information according to the first image and obstacle information detected by a first radar, and acquiring the current traffic flow information according to the second image and obstacle information detected by a second radar.

Here, a detection distance of the first radar is greater than that of the second radar.

In an arrangement, the first radar may have a height higher than that of the second radar. In this way, the first radar is configured to detect obstacle information in the distance while the second radar is configured to detect obstacle information in the vicinity of the intelligent road side unit. Here, the obstacle information may include information about a distance between an obstacle and the intelligent road side unit, an orientation of the obstacle, or the like.

Since a laser radar has advantages of high accuracy and anti-interference capability, in a specific implementation, each of the first radar and the second radar may be a laser radar.

The intelligent road side unit may determine the anticipated arriving traffic flow information accurately according to the first image and the obstacle information in the distance detected by the first radar, and determine the current traffic flow information according to the second image and the obstacle information in the vicinity of the intelligent road side unit detected by the second radar, thereby controlling the traffic lights according to the anticipated arriving traffic flow information and the current traffic flow information.

Since the radars may detect information about a distance, a speed, an orientation, etc., of a vehicle accurately, the traffic lights may be controlled according to the vehicle information detected by the radars and images captured by the cameras, thereby improving the control accuracy of the intelligent road side unit to the traffic lights and the regulation accuracy of the intelligent road side unit significantly.

Furthermore, the regulation method in the intelligent road side unit may further comprise: transmitting the obstacle information detected by the radars, images captured by the cameras and the green-light time period to a server or an unmanned vehicle through an antenna.

The unmanned vehicle may receive the information transmitted from the intelligent road side unit, and performs corresponding controlling operations according to the received information, thereby improving the security and reliability of the unmanned vehicle.

In order to prevent the antenna from interfering with the cameras, the distance between the antenna and the cameras is greater than a preset distance. That is to say, the distance between the antenna and the first camera is greater than the preset distance, and the distance between the antenna and the second camera is greater than the preset distance.

To implement the above embodiments, the embodiments of the present disclosure further provide an intelligent road side unit, including a processor and a memory.

The processor runs a program corresponding to executable program codes by reading the executable program codes stored in the memory, to implement the regulation method in the intelligent road side unit according to the embodiments as described above.

To implement the above embodiments, the embodiments of the present disclosure further provide a non-transitory computer readable storage medium having a computer program stored thereon. When the program is executed by a processor, the program implements the regulation method in the intelligent road side unit according to the embodiments as described above.

Throughout the description of the present disclosure, terminologies "an embodiment", "some embodiments", "an example", "a specific example", or "some examples", means that features, structures, materials, or characteristics described in connection with the embodiment(s) or example (s) may be included in at least one embodiment or example of the present disclosure. Thus, the illustrative description for the above terminologies in this disclosure is not necessarily directed to the same embodiment or example. Furthermore, the specific features, structures, materials, or characteristics described herein may be combined in any suitable manner in one or more embodiments or examples. If not contradictory, different embodiments or examples and features in the different embodiments or examples may be combined by those skilled in the art.

In addition, terminologies such as "first" and "second" are used herein for purposes of description and are not intended to indicate or imply relative importance or significance, or indicate or imply the number of the indicated technical features. Furthermore, the feature defined with "first" and "second" may comprise at least one of the features distinctly or implicitly. In the description of the present disclosure, "a plurality of" means at least two, such as two or three, unless stated definitely and specifically.

Any process or method described in the flow charts or described in any other way herein may be understood as including one or more modules, sections or parts of executable codes for implementing custom logic functions or procedures. Moreover, preferred embodiments of the present disclosure comprises other implementations in which the functions may be performed in an order rather than the order depicted or discussed, including in a substantially simultaneous manner or in an inversed order according to the related functions, which should be understood by those skilled in the art.

The logics and/or steps shown in the flow chart or in other manners described herein, for example, may be regarded as an ordered list of executable instructions for implementing the logical functions, and may be embodied in any computer readable medium to be used by an instruction execution system, apparatus or device, such as a system based on a computer, a system including processors, or other systems capable of fetching and executing instructions from the instruction execution system, apparatus or device, or to be used in combination with the instruction execution system, apparatus or device. Here, the terminology "computer readable medium" may refer to any means configured for containing, storing, communicating, propagating or transmitting programs to be used by or in combination with the instruction execution system, apparatus or device. More specific examples of the computer readable medium comprise but not exhaustively: an electronic connection (an electronic device) with one or more wires, a portable computer disk cartridge (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even include a paper or other appropriate medium with those programs printed thereon, which, for example, may be optically scanned and then edited, interpreted or processed in other appropriate way when necessary so as to obtain the programs in an electrical manner and to store it in the computer memories.

In addition, respective functional units in respective embodiments of the present disclosure may be integrated in one processing module, or may be presented as physically separated units, or may be implemented as two or more unites integrated in one module. The above integrated module may be implemented in hardware or as a software functional module. When the integrated module is implemented as a software function module and is sold or used as a standalone product, it may be stored in a computer readable storage medium.

The storage medium mentioned above may be read-only memories, magnetic disks, CDs, etc. Although explanatory embodiments have been illustrated and described, it is to be understood that the above embodiments are only illustrative and should not be construed to limit the present disclosure. Those skilled in the art may make changes, alternatives, and modifications to the embodiments without departing from the spirit, principles and scope of the present disclosure.

What is claimed is:

1. An intelligent road side unit, comprising:
    traffic lights;
    a first camera configured to acquire a first image and having a first focal length;
    a second camera configured to acquire a second image and having a second focal length, the first focal length being greater than the second focal length; and
    a controller, configured to acquire anticipated arriving traffic flow information according to the first image, to acquire current traffic flow information according to the second image, and to control the traffic lights according to the anticipated arriving traffic flow information and the current traffic flow information,
    wherein the first image is an image within a preset distance range of a road in the distance, and the second image is an image within a preset distance range of the road in the vicinity,
    wherein the controller is further configured to:
        acquire the number of vehicles in the road in the distance by recognizing the first image, and to determine the anticipated arriving traffic flow information according to the number of the vehicles in the road in the distance;
        acquire the number of vehicles in the road in the vicinity by recognizing the second image, and to determine the current traffic flow information according to the number of vehicles in the road in the vicinity;
        determine a current green-light time period according to the current traffic flow information;
        determine a delayed green-light time period according to the anticipated arriving traffic flow information;
        determine a total green-light time period according to the current green-light time period and the delayed green-light time period; and
        control the traffic lights according to the total green-light time period, to allow both the vehicles in the distance and the vehicles in the vicinity to pass the intersection,
    wherein, the current green-light time period is a total intersection passing-through time for the vehicles in the road in the vicinity, and the delayed green-light time period is an arrival time for the approaching vehicles in the road in the distance, and
    wherein, the intelligent roadside unit is further configured to:
        calculate the current green-light time according to the current traffic flow information and an average speed at which the vehicles pass through the intersection; and
        calculate a sum of the current green-light time period and the delayed green-light time period, as the total green-light time period.

2. The intelligent road side unit according to claim 1, wherein a mounting position of the first camera is higher than that of the second camera.

3. The intelligent road side unit according to claim 1, further comprising:

a shielding layer for enclosing at least part of each of the first and second cameras.

4. The intelligent road side unit according to claim 3, wherein the shielding layer encloses each of the first and second cameras except for a lens portion and a heat dissipation portion of that camera.

5. The intelligent road side unit according to claim 1, further comprising:
a first radar; and
a second radar,
wherein a detection distance of the first radar is greater than that of the second radar.

6. The intelligent road side unit according to claim 5, wherein each of the first radar and the second radar is a laser radar.

7. The intelligent road side unit according to claim 1, further comprising:
an antenna,
wherein a distance between the antenna and the first camera is greater than a preset distance, and a distance between the antenna and the second camera is greater than the preset distance.

8. A regulation method in an intelligent road side unit, comprising:
acquiring a first image via a first camera having a first focal length and a second image via a second camera having a second focal length, the first focal length being greater than the second focal length;
acquiring anticipated arriving traffic flow information according to the first image, and current traffic flow information according to the second image; and
controlling traffic lights according to the anticipated arriving traffic flow information and the current traffic flow information,
wherein the first image is an image within a preset distance range of a road in the distance, and the second image is an image within a preset distance range of the road in the vicinity,
wherein controlling traffic lights according to the anticipated arriving traffic flow information and the current traffic flow information further comprises:
acquiring the number of vehicles in the road in the distance by recognizing the first image, and determining the anticipated arriving traffic flow information according to the number of the vehicles in the road in the distance;
acquiring the number of vehicles in the road in the vicinity by recognizing the second image, and determining the current traffic flow information according to the number of vehicles in the road in the vicinity;
determining a current green-light time period according to the current traffic flow information;
determining a delayed green-light time period according to the anticipated arriving traffic flow information;
determining a total green-light time period according to the current green-light time period and the delayed green-light time period; and
controlling the traffic lights according to the total green-light time period, to allow both the vehicles in the distance and the vehicles in the vicinity to pass the intersection,
wherein, the current green-light time period is a total intersection passing-through time for the vehicles in the road in the vicinity, and the delayed green-light time period is an arrival time for the approaching vehicles in the road in the distance, and wherein, the method further comprises:
calculating the current green-light time according to the current traffic flow information and an average speed at which the vehicles pass through the intersection; and
calculating a sum of the current green-light time period and the delayed green-light time period, as the total green-light time period.

9. The regulation method in the intelligent road side unit according to claim 8, wherein a mounting position of the first camera is higher than that of the second camera.

10. The regulation method in the intelligent road side unit according to claim 8, wherein at least part of the camera is enclosed by a shielding layer.

11. The regulation method in the intelligent road side unit according to claim 8, wherein acquiring the anticipated arriving traffic flow information according to the first image, and the current traffic flow information according to the second image, comprises:
acquiring the anticipated arriving traffic flow information according to the first image and obstacle information detected by a first radar, and acquiring the current traffic flow information according to the second image and obstacle information detected by a second radar,
wherein a detection distance of the first radar is greater than that of the second radar.

12. The regulation method in the intelligent road side unit according to claim 11, wherein each of the first radar and the second radar is a laser radar.

13. The regulation method in the intelligent road side unit according to claim 10, wherein the shielding layer enclose the camera except for a lens portion and a heat dissipation portion.

14. A non-transitory computer readable storage medium having a computer program stored thereon, wherein when the program is executed by a processor, the program implements a regulation method in an intelligent road side unit, comprising:
acquiring a first image via a first camera having a first focal length and a second image via a second camera having a second focal length, the first focal length being greater than the second focal length;
acquiring anticipated arriving traffic flow information according to the first image, and current traffic flow information according to the second image; and
controlling traffic lights according to the anticipated arriving traffic flow information and the current traffic flow information,
wherein the first image is an image within a preset distance range of a road in the distance, and the second image is an image within a preset distance range of the road in the vicinity,
wherein controlling traffic lights according to the anticipated arriving traffic flow information and the current traffic flow information further comprises:
acquiring the number of vehicles in the road in the distance by recognizing the first image, and determining the anticipated arriving traffic flow information according to the number of the vehicles in the road in the distance;
acquiring the number of vehicles in the road in the vicinity by recognizing the second image, and determining the current traffic flow information according to the number of vehicles in the road in the vicinity;
determining a current green-light time period according to the current traffic flow information;

determining a delayed green-light time period according to the anticipated arriving traffic flow information;

determining a total green-light time period according to the current green-light time period and the delayed green-light time period; and controlling the traffic lights according to the total green-light time period, to allow both the vehicles in the distance and the vehicles in the vicinity to pass the intersection, wherein, the current green-light time period is a total intersection passing-through time for the vehicles in the road in the vicinity, and the delayed green-light time period is an arrival time for the approaching vehicles in the road in the distance, and wherein, the method further comprises:

calculating the current green-light time according to the current traffic flow information and an average speed at which the vehicles pass through the intersection; and calculating a sum of the current green-light time period and the delayed green-light time period, as the total green-light time period.

\* \* \* \* \*